United States Patent [19]
Takemura et al.

[11] Patent Number: 6,096,830
[45] Date of Patent: Aug. 1, 2000

[54] THERMOPLASTIC ELASTOMER COMPOSITION, PROCESS FOR PRODUCING THE SAME AND GOLF BALL USING THE SAME FOR COVER

[75] Inventors: Kouhei Takemura, Nara; Akihiro Nakahara, Ibaraki; Yoshinori Sano, Shirakawa, all of Japan

[73] Assignee: Sumitomo Rubber Industries, Ltd., Hyogo-ken, Japan

[21] Appl. No.: 08/667,728

[22] Filed: Jun. 21, 1996

Related U.S. Application Data

[63] Continuation-in-part of application No. 08/541,267, Oct. 12, 1995, abandoned.

[30] Foreign Application Priority Data

Oct. 14, 1994 [JP] Japan ................................ 6-275813
Oct. 14, 1994 [JP] Japan ................................ 6-275814

[51] Int. Cl.$^7$ ............................ A63B 37/12; A63B 37/00; C08L 23/26; C08J 3/24
[52] U.S. Cl. ......................... 525/192; 525/197; 525/194; 525/331.9; 525/329.9; 473/378
[58] Field of Search .................. 525/192, 194, 525/197, 329.7, 329.9, 331.9; 473/378

[56] References Cited

U.S. PATENT DOCUMENTS

| | | | |
|---|---|---|---|
| 3,037,954 | 6/1962 | Gessler et al. | |
| 4,591,615 | 5/1986 | Aldred et al. | 525/179 |
| 4,829,124 | 5/1989 | Clark | 525/119 |
| 4,851,468 | 7/1989 | Hazelton et al. | 524/519 |
| 4,920,177 | 4/1990 | George | 525/195 |
| 5,021,500 | 6/1991 | Puydak et al. | 524/525 |
| 5,407,998 | 4/1995 | Horiuchi et al. | 525/133 |

*Primary Examiner*—Jeffrey Mullis
*Attorney, Agent, or Firm*—Birch, Stewart, Kolasch & Birch, LLP

[57] ABSTRACT

Disclosed is a thermoplastic elastomer composition having characteristics of both thermoplastic resin and rubber, and a golf ball using the thermoplastic elastomer composition as the cover. The thermoplastic elastomer composition of the present invention comprises a thermoplastic resin and crosslinked diene rubber particles having an average diameter of not more than 10 $\mu$m dispersed in the thermoplastic resin, which is prepared by dynamic crosslinking diene rubber dispersed in the thermoplastic resin with crosslinking agent.

11 Claims, 1 Drawing Sheet

THERMOPLASTIC ELASTOMER COMPOSITION, PROCESS FOR PRODUCING THE SAME AND GOLF BALL USING THE SAME FOR COVER

This application is a continuation-in-part of application Ser. No. 08/541,267, filed Oct. 12 1995, now abandoned.

FIELD OF THE INVENTION

The present invention relates to a thermoplastic elastomer composition wherein fine crosslinked diene rubber particles are dispersed in a thermoplastic resin, and a process for producing the same. The present invention is also related to a golf ball using the thermoplastic elastomer composition as cover.

BACKGROUND OF THE INVENTION

By the term "dynamic crosslinking" is meant that rubber is crosslinked while being mixed with molten thermoplastic resin. The dynamic crosslinking has hitherto been carried out to disperse rubber in thermoplastic resin, as described in Japanese Laid-Open Patent Publication No. 5-29653. However, the dynamic crosslinking is generally conducted in order to improve a processability or a modulus of rubber, and there is very few examples wherein a restoring force (e.g. permanent compression set, elongation set, etc.) of thermoplastic resin are improved.

Under these circumstances, it is reported in Japanese Laid-Open Patent Publication Nos. 2-235949 and 4-63850 that a restoring force of a thermoplastic resin is improved. According to the methods disclosed in the prior art, the permanent compression set of the thermoplastic resin is improved to some extent but the degree of improvement is small in comparison with the permanent compression set of the rubber.

As described above, modulus or processability is improved but the restoring force is not improved sufficiently by the conventional dynamic crosslinking.

OBJECTS OF THE INVENTION

One object of the present invention is to make the restoring force similar to that of the crosslinked rubber without damaging physical properties of the thermoplastic resin, thereby providing a thermoplastic elastomer composition having characteristics of both thermoplastic resin and rubber.

Another object of the present invention is to provide a golf ball using the above thermoplastic elastomer for the cover.

These objects as well as other objects and advantages of the present invention will become apparent to those skilled in the art from the following description with reference to the accompanying drawings.

SUMMARY OF THE INVENTION

Figure 1:
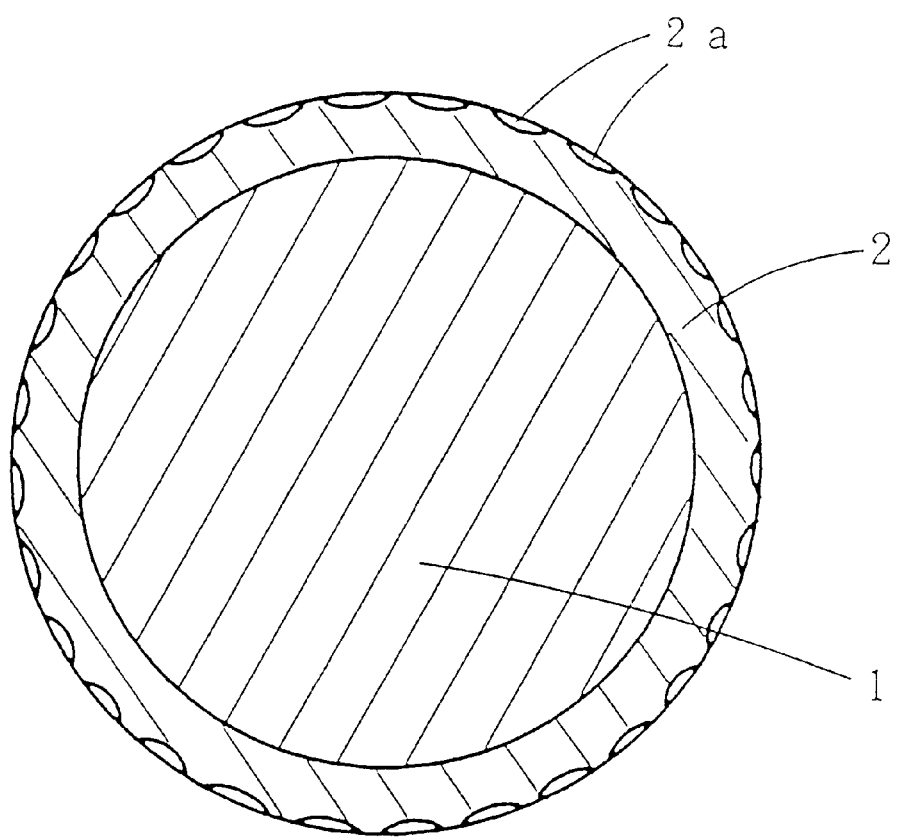
FIG. 1 is a schematic cross section illustrating one embodiment of the golf ball of the present invention.

According to the present invention, the above object has been accomplished by dispersing a diene rubber in a thermoplastic resin and dynamically crosslinking the diene rubber with a crosslinking agent to disperse crosslinked diene rubber particles having an average particle size of not more than 10 µm in the thermoplastic resin, thereby affording a thermoplastic elastomer composition.

That is, the present inventors have intensively studied to disperse the rubber in the thermoplastic resin. As a result, it has been found that a restoring force is considerably improved when the crosslinked diene rubber particles to be dispersed are fine and, at the same time, a decrease in mechanical strength becomes small when a resin matrix forms a continuous layer. According to the resulting knowledge, a restoring force of the thermoplastic elastomer composition is considerably improved by dispersing crosslinked diene rubber particles having an average particle size of not more than 10 µm in the thermoplastic resin by dynamic crosslinking and, at the same time, a decrease in mechanical strength is inhibited, thereby providing a thermoplastic elastomer composition having excellent characteristics of both thermoplastic resin and diene rubber.

Particularly, a restoring force is considerably improved and a thermoplastic elastomer composition having excellent characteristics of the thermoplastic resin and diene rubber at, an optimum state when using an ethylene-acrylic acid copolymer neutralized with a metal ion; an ethylene-methacrylic acid copolymer neutralized with a metal ion or an ethylene-acrylic acid-methacrylic acid terpolymer neutralized with a metal ion, which is referred to as an ionomer resin, as the thermoplastic resin and using an ethylene-propylene-diene rubber (EPDM) as the diene rubber. In addition, it is possible to disperse crosslinked diene rubber fine particles in the thermoplastic resin by controlling torque change at the time of dynamic crosslinking.

U.S. Pat. No. 5,407,998 to Horiuchi et al. discloses a golf ball comprising a core and a cover wherein the cover is mainly made of a mixture composed of an ionomer resin and a diene type rubber at a weight ratio of 95:5–60:40 and the diene type rubber is crosslinked by a crosslinking agent. This patent does not suggest that rubber particles in the ionomer resin are not specified. In order to finely disperse the rubber particles having not more than 10 µm in the thermoplastic resin, the dynamic crosslinking should be conducted and terminated as specified in the present invention.

DETAILED DESCRIPTION OF THE INVENTION

Next, the present invention will be explained in detail.

In the present invention, the thermoplastic resin to be used for preparing the thermoplastic elastomer composition is not specifically limited, and preferred examples thereof include ethylene-acrylic acid copolymer neutralized with a metal ion, ethylene-methacrylic acid copolymer neutralized with a metal ion, ethylene-acrylic acid-methacrylic acid terpolymer neutralized with a metal ion, etc. Among them, the ethylene-methacrylic acid copolymer neutralized with a metal ion is particularly preferred. In addition, examples of the alkaline metal ion to neutralize the above copolymers include alkaline metal ions such as sodium ion, potassium ion, lithium ion, etc.; divalent metal ions such as zinc ion, calcium ion, magnesium ion, copper ion, manganese ion, etc.; trivalent metal ions such as aluminum ion, neodymium ion, etc. Among them, zinc ion is preferred because binding power of a metal ion aggregate is high and, therefore, a decrease in mechanical strength due to dispersion of crosslinked diene rubber particles is small.

Preferred examples of the above ethylene-acrylic acid copolymer neutralized with a metal ion are ethylene-acrylic acid copolymer ionomer resin neutralized with zinc ion [e.g. IOTEK 7010 (trade name), manufactured by Exxon Chemical Co., etc.], ethylene-acrylic acid copolymer ionomer resin neutralized with sodium ion [e.g. IOTEK 8000 (trade name), etc., manufactured by Exxon Chemical Co.] and the like. Preferred examples of the ethylene-methacrylic acid copolymer neutralized with a metal ion are ethylene-methacrylic acid copolymer ionomer resin neutralized with zinc ion [e.g. Hi-milan 1705, Hi-milan 1706, Hi-milan AM7315, Hi-milan AM7317 (trade name), etc. manufactured by Mitsui Du Pont Polychemical Co., Ltd.], ethylene-methacrylic acid copolymer ionomer resin neutralized with sodium ion [e.g. Hi-milan 1605, Hi-milan 1707 (trade name), etc. manufactured by Mitsui Du Pont Polychemical Co., Ltd.] and the like. Preferred examples of the ethylene-acrylic acid-methacrylic acid terpolymer neutralized with a metal ion are ethylene-acrylic acid-methacrylic acid copolymer ionomer resin neutralized with zinc ion [e.g. Hi-milan (trade name), etc. manufactured by Mitsui Du Pont Polychemical Co., Ltd.], ethylene-acrylic acid-methacrylic acid copolymer ionomer resin neutralized with sodium ion [e.g. Hi-milan (trade name), etc. manufactured by Mitsui Du Pont Polychemical Co., Ltd.] and the like.

On the other hand, the diene rubber is not specifically limited, and examples thereof are ethylene-propylene-diene rubber (EPDM), butadiene rubber (BR), butyl rubber (IR), styrene-butadiene rubber (SBR), nitrile-butadiene rubber (NBR), etc. Among them, ethylene-propylene-diene rubber and butadiene rubber are particularly preferred.

A weight ratio of the thermoplastic resin to the diene rubber is preferably 30:70 to 95:5, particularly 30:70 to 80:20. When the ratio of the thermoplastic resin is less than the above range, the strength of the thermoplastic resin is lowered and it is difficult to obtain a thermoplastic elastomer composition having a high strength. On the other hand, when the ratio of the thermoplastic resin is more than the above range, the restoring force such as elongation set of the thermoplastic elastomer composition due to the diene rubber may not be improved.

The crosslinking agent is not specifically limited and various crosslinking agents other than peroxides can be used. Examples thereof are sulfur; a vulcanization accelerator; an oxime; a combination of sulfur and vulcanization accelerator and the like. Examples of the vulcanization accelerators are dibenzothiazyl sulfide, N,N'-dicyclohexyl-2-benzothiazyl sulfenamide, hexamethylenetetramine, mercaptobenzothiazole, tetramethylthiuram disulfide, tetraethylthiuram disulfide, tetrabutylthiuram disulfide, etc. But it is not specifically limited and there can be used various vulcanization accelerators which are generally used in the rubber formulation. Examples of the oxime crosslinking agents are p-quinonedioxime, p,p'-dibenzoylquinone dioxime, etc. However, peroxides are not used as the crosslinking agent because the thermoplastic resin is crosslinked, simultaneously, and it is impossible to carry out molding processing in case of peroxides.

An amount of the crosslinking agent is preferably 0.2 to 10 parts by weight, particularly 1 to 5 parts by weight, based on 100 parts by weight of the diene rubber in a mixture of the thermoplastic resin and diene rubber. When the amount of the crosslinking agent is less than the above range, the diene rubber is not sufficiently crosslinked and, therefore, the restoring force is not sufficiently improved. On the other hand, when the amount of the crosslinking agent is more than the above range, the crosslinking proceeds too rapidly and, therefore, it is difficult to form fine crosslinked rubber particles. Thereby, it is likely to cause poor strength.

In addition, in order to obtain desired physical properties, fillers, processing aids, plasticizers, etc. may be formulated in the composition containing the above thermoplastic resin, diene rubber and crosslinking agent.

A temperature of the above formulation materials containing the crosslinking agent, i.e. a temperature at the time of dynamic crosslinking, is suitably within a range between a temperature which is 20° C. lower than an activation reaction temperature of the crosslinking agent and 250° C. For example, when using sulfur in combination with the vulcanization accelerator, the temperature at the time of dynamic crosslinking is suitably 130 to 250° C. because the activation temperature is generally about 150° C. In addition, in the case of the oxime crosslinking agent, the temperature at the time of dynamic crosslinking is suitably 160 to 250° C. because the activation temperature is generally about 180° C. When the temperature at the time of dynamic crosslinking is lower than the above range, the crosslinking of the diene rubber does not proceed sufficiently. In addition, even if crosslinking arises the, working efficiency is inferior because of low the crosslinking rate. On the other hand, when the temperature at the time of dynamic crosslinking is higher than the above range, the physical properties of the diene rubber are deteriorated and it is difficult to improve the restoring force such as the elongation set.

As kneading methods, there can be used various kneading methods using a kneader, a Banbury mixer, an extruder, a roll, etc. It is particularly preferred to use a kneader or an extruder because a large shear force is applied thereto.

The fillers may be formulated at the time of dynamic crosslinking or may be previously formulated in the diene rubber. In addition, the thermoplastic resin may be previously mixed with the diene rubber using roll, kneader, Banbury, extruder, etc., followed by conduct of the dynamic crosslinking, if possible. When the mixing can be carried out at a temperature lower than the activation temperature of the crosslinking agent, all formulation materials such as thermoplastic resin, diene rubber, filler, crosslinking agent, etc., may be mixed at a temperature lower than the activation temperature of the crosslinking agent, followed by conducting the dynamic crosslinking.

It is preferred that the dynamic crosslinking is controlled with monitoring a torque applied to a mixing machine. The dynamic crosslinking is terminated immediately before or after the torque becomes stable although it has once increased due to the crosslinking of the diene rubber. For example, asuming that the torque before dynamic crosslinking is calculated into 100 and the following ratio of the thermoplastic resin to diene rubber is A:

$$A = \frac{\text{weight of diene rubber}}{\text{weight of thermoplastic resin} + \text{weight of deign rubber}},$$

the dynamic crosslinking is terminated upon reaching the torque value of B defined by the equation:

B=100+(10×A) or more.

Hereinafter, this torque B is referred to as an ideal torque ratio. It is particularly preferred to satisfy the condition that the torque is more than the above value of the ideal torque ratio and to terminate the dynamic crosslinking after reaching the maximum value. If the actual torque value before dynamic crosslinking is 20 which times 5 to be 100, and A is rubber weight being 30 g/(resin weight being 70 g+rubber weight being 30 g)=3/10, then the ideal torque is 100+(10× 3/10)=103 which is then divided by 5 to be 20.6. Accordingly, when the actual torque exceeds 20.6, the dynamic crosslinking is terminated. The torque is generally displayed in a machine which is used for dynamic crosslinking, but is sometimes expressed as electric current flowing through the machine. Even if the torque is expressed as electric current, the above ideal torque is applicable.

In the present invention, the average particle size of the crosslinked diene rubber particles dispersed in the thermoplastic resin is not more than 10 $\mu$m, preferably 0.02 to 8 $\mu$m. When the average particle size of crosslinked diene rubber particles dispersed is larger than 10 $\mu$m, the restoring force such as elongation set is not sufficiently improved and the mechanical strength of the thermoplastic resin is lowered.

It is advantageous for the improvement of the restoring force and prevention of a decrease in mechanical strength to use crosslinked diene rubber particles having a smaller particle size. When the particle size is too small, the restoring force of the thermoplastic elastomer is similar to that of the thermoplastic resin and the restoring force is not improved. Therefore, those having an average particle size of not less than 0.001 $\mu$m are preferred for practical use.

It is suitable to control the termination of the dynamic crosslinking by the torque value, as described above. The time varies depending on the kind of the crosslinking agent, formulation, amount of the formulation materials, etc., but is generally about 1 to 60 minutes. For example, when using sulfur in combination with the vulcanization accelerator, it is about 2 to 30 minutes. When using the oxime crosslinking agent, it is about 3 to 60 minutes.

The thermoplastic elastomer of the present invention can be applied for various utilities. When the thermoplastic elastomer composition of the present invention is used as a base polymer of a cover of a golf ball, its physical performance is fully advantageous. When using it as the cover of the golf ball, it can be covered on either a core for solid golf balls (solid core) or a core for thread wound golf balls (thread wound core).

The solid core may be either a single-layer structure core or a multi-layer core of two or more layers. For example, as the core for a two-piece golf ball, those obtained by subjecting a rubber composition to a press vulcanization (crosslinking) to compress with heating (e.g. at a temperature of 140 to 170° C. for 10 to 40 minutes) into a spherical vulcanized material can be used. The rubber composition is composed of 100 parts by weight of a butadiene rubber, 10 to 60 parts by weight of at least one vulcanizing agent (crosslinking agent) of $\alpha$, $\beta$-ethylenically unsaturated carboxylic acids (e.g. acrylic acid, methacrylic acid, etc.) or metal salts thereof and functional monomers (e.g. trimethylolpropane trimethacrylate, etc.), 10 to 30 parts by weight of a filler (e.g. zinc oxide, barium sulfate, etc.), 0.5 to 5 parts by weight of a peroxide (e.g. dicumyl peroxide, etc.) and 0.1 to 1 part by weight of an antioxidant.

The thread wound core is composed of a center and a thread rubber wound on the center. As the center, either a liquid center or a rubber center can be used. As the rubber center, there can be used those obtained by vulcanizing the same rubber composition as that of the solid core.

The thread rubber may be those which have hitherto been used. For example, it can be obtained by vulcanizing a rubber composition which is a mixture of an antioxidant, a vulcanizing accelerator and sulfur formulated with a natural rubber or a natural rubber and synthetic polyisoprene. The core is not limited to the solid core and thread wound core.

A method of covering the cover on the core is not specifically limited, but may be a general method. For example, there can be employed a method comprising molding a composition for the cover prepared by formulating a suitable amount of a requisite additive in the specific base material for the cover into a semi-spherical half-shell in advance, covering a core the with two half-shells and then subjecting the resultant core plus sphere to a pressure molding at 100 to 170° C. for 1 to 15 minutes, or a second method may be used comprising subjecting the composition for the cover to an injection molding directly to cover the core. The thickness of the cover is generally about 1 to 4 mm. In the case of cover molding, dimples may be formed on the surface of the ball. If necessary, paint or marking may be provided after cover molding.

Then, the construction of the golf ball of the present invention will be explained with reference to the accompanying drawing.

The golf ball shown in FIG. 1 is a two-piece solid golf ball comprising a core 1 of a vulcanized molded article of a rubber composition and a cover 2 for covering the core.

The core 1 is a solid core, but is not specifically limited. For example, the above vulcanized molded material of the rubber composition comprising a butadiene rubber as the main material is preferably used as the solid core. The cover 2 is made of a cover composition, comprising the above specific thermoplastic elastomer as a base polymer. In addition, 2a is a dimple provided on the cover 2. The core 1 is composed of the vulcanized molded article of the rubber composition of a single-layer structure, but it may be a solid core of a two-layer structure which is obtained by forming an outer core of a vulcanized molded material of a rubber composition comprising a butadiene rubber as a main material around an inner core of a vulcanized molded material of a rubber composition comprising a butadiene rubber as a main material, or a thread wound core which is obtained by forming a thread rubber at a stretched state around a liquid or rubber center.

A suitable number of dimples 2a may be provided on the cover 2 so that desired flight characteristics may be obtained. In addition, paint finishing and marking may be optionally provided on the surface of the golf ball.

As described above, the present invention provides a thermoplastic elastomer composition which has characteristics of both thermoplastic resins and diene rubber. For example, the composition has excellent restoring force and excellent characteristics (e.g. tensile strength, elongation, etc.).

Also, the present invention provides a golf ball which has excellent shot feel and high resilience performances and attains a long flight distance.

EXAMPLES

The following Examples and Comparative Examples further illustrate the present invention in detail but are not to be construed to limit the scope thereof.

Examples 1 to 3 and Comparative Examples 1 to 3

In Examples 1 to 3, the following components thermoplastic resin, diene rubber and crosslinking agent were used in the amount described in Table 1 while changing the ratio of the diene rubber to the thermoplastic resin, and the mixture was subjected to dynamic crosslinking. In Comparative Examples 1 to 3, the components were used in the amount described in Table 2, and the mixture was only kneaded and were not subjected to dynamic crosslinking.
Thermoplastic Resin:

Hi-milan AM7315 (trade name, ethylene-methacrylic acid copolymer ionomer resin neutralized with a zinc ion manufactured by Mitsui Du Pont Polychemical Co., Ltd.)

Diene Rubber:

Esprene 501A (trade name, ethylene-propylene-diene rubber (EPDM) manufactured by Sumitomo Chemical Industries Co., Ltd.)

Crosslinking Agent:

Balnoc (trade name, p,p'-dibenzoylquinone dioxime manufactured by Nihon Yushi Co., Ltd.)

The dynamic crosslinking in Examples 1 to 3 was carried out with kneading the formulation materials shown in Table 1 at 180° C. at 100 rpm using a laboplast mill manufactured by Toyo Seiki Co., Ltd. Then, the sample obtained after the termination of the dynamic crosslinking was pulverized into pieces of 3 to 5 mm, which was subjected to sheet press at 170° C. for 15 minutes to give a sample for the measurement of physical properties.

The termination of the dynamic crosslinking in Examples 1 to 3 was carried out by a method comprising terminating immediately after satisfying the above ideal torque ratio and reaching the maximum torque ratio. The kneading in Comparative Examples 1 to 3 was carried out by a method comprising kneading for the same time as that required for the dynamic crosslinking in the corresponding Example.

In addition, the particle size was determined by taking a reflection electron image micrograph using a scanning electron microscope (Model T-220A, manufactured by JEOL Co.) and measuring a perpendicular length of any fifty rubber particles. The numerical value due to number average was taken as an average particle size. In addition, no dynamic crosslinking was carried out in Comparative Examples 1 to 3 and the thermoplastic resin and diene rubber form a continuous layer, respectively. Therefore, the particle size could not be measured. In addition, physical properties (tensile strength, elongation and elongation set) of the resulting crosslinked material were measured according to JIS-K6301 (Physical test method of vulcanized rubber).

The formulation, revolution number at the time of dynamic crosslinking, ideal torque ratio, maximum torque ratio, average particle size of crosslinked diene rubber particles and physical properties of crosslinked materials of Examples 1 to 3 are shown in Table 1. The formulation, revolution number at the time of kneading, time and physical properties of crosslinked materials of Comparative Examples 1 to 3 are shown in Table 2.

In addition, the amounts of the respective formulation materials in the respective tables are parts by weight. The thermoplastic resin and diene rubber are indicated by the trade name in the tables.

TABLE 1

|  | Example 1 | Example 2 | Example 3 |
|---|---|---|---|
| Hi-milan AM7315 | 80 | 60 | 30 |
| Esprene 501A | 20 | 40 | 70 |
| Barium sulfate | 4 | 8 | 14 |
| Stearic acid | 0.2 | 0.4 | 0.7 |
| Crosslinking agent (oxime) (based on 100 parts by weight of rubber) | 0.4 (2) | 0.8 (2) | 1.4 (2) |
| Revolution number (rpm) | 100 | 100 | 100 |
| Ideal torque ratio | 102 | 104 | 107 |
| Maximum torque ratio | 105 | 108 | 115 |
| Average particle size (μm) | 8 | 4 | 6 |
| Tensile strength (kg/cm²) | 235.9 | 158.9 | 97.0 |
| Elongation (%) | 304 | 174 | 267 |
| Elongation set (%) | 22.3 | 7.8 | 5.8 |

TABLE 2

|  | Comparative Example 1 | Comparative Example 2 | Comparative Example 3 |
|---|---|---|---|
| Hi-milan AM7315 | 80 | 60 | 30 |
| Esprene 501A | 20 | 40 | 70 |
| Barium sulfate | 4 | 8 | 14 |
| Stearic acid | 0.2 | 0.4 | 0.7 |
| Revolution number (rpm) | 100 | 100 | 100 |
| Time (minute) | 10 | 10 | 7 |
| Tensile strength (kg/cm²) | 234.3 | 145.7 | 83.2 |
| Elongation (%) | 317 | 167 | 161 |
| Elongation set (%) | 82.4 | 65.0 | 39.0 |

As is shown in Table 1, the thermoplastic elastomer compositions of Examples 1 to 3 showed a small elongation set and were superior in restoring force. That is, the physical properties vary depending on the ratio of the thermoplastic resin to the diene rubber, but the thermoplastic elastomer composition of Example 1 wherein the ratio of the thermoplastic resin is the highest showed an elongation set of 22.3%. It showed a small elongation set and was superior in restoring force to that of Comparative Example 1 wherein the formulation is the same but no crosslinking agent is contained as well as that of Comparative Example 3 wherein the ratio of the thermoplastic resin is the smallest Example 4

According to the same manner as that described in Example 1 except for changing the kind of the crosslinking agent and using sulfur and a vulcanization as the crosslinking agent, the mixture was subjected to dynamic crosslinking to produce a thermoplastic elastomer composition, and physical properties thereof were measured.

The formulation, revolution number at the time of dynamic crosslinking, ideal torque ratio, maximum torque ratio, average particle size of crosslinked diene rubber particles and physical properties of the crosslinked material of Example 4 are shown in Table 3. In addition the, Comparative Example which corresponds to Example 4 is Comparative Example 1 and, therefore, the formulation amount, revolution number at the time of kneading, time and physical properties of the crosslinked material of Comparative Example 1 are also shown in Table 3. In addition, the indicating method, dynamic crosslinking method and measuring method of the particle size and physical properties are the same as those of Example 1.

In addition, the crosslinking agent used in Example 4 is as follows.

Crosslinking Agent:
  Sulfur
  Vulcanization accelerator (tetrabutylthiuram disulfide, Nocceler TBT-N (trade name), manufactured by Ohuchi Shinko Kagaku Kogyo Co., Ltd.)

TABLE 3

|  | Example 4 | Comparative Example 1 |
|---|---|---|
| Hi-milan AM7315 | 80 | 80 |
| Esprene 501A | 20 | 20 |
| Barium sulfate | 4 | 4 |
| Stearic acid | 0.2 | 0.2 |
| Crosslinking agent (based on 100 parts by weight ot rubber) sulfur | 0.4 (2) | 0 |

TABLE 3-continued

|  | Example 4 | Comparative Example 1 |
|---|---|---|
| Vulcanization accelerator TBT-N | 0.4 (2) | 0 |
| Revotution number (rpm) | 100 | 100 |
| Ideal torque ratio | 102 | time |
| Maximum torque ratio | 109 | 10 minutes |
| Average particle size ($\mu$m) | 1.2 |  |
| Tensile strength (kg/cm$^2$) | 249.2 | 234.3 |
| Elongation (%) | 310 | 317 |
| Elongation set (%) | 23.1 | 82.4 |

As is apparent from the results shown in Table 3, the thermoplastic elastomer composition of Example 4 showed a small elongation set and was superior in restoring force to that of the corresponding Comparative Example 1. In addition, a considerable decrease in tensile strength and elongation was not observed.

Examples 5 to 6 and Comparative Examples 4 to 5

According to the same manner as that described in Example 1 except for changing the kind of the diene rubber, the mixture was subjected to dynamic crosslinking to produce a thermoplastic elastomer composition, in Examples 5 to 6. According to the same manner as that described in Example 1 except for changing the kind of the thermoplastic resin, the mixture was only kneaded to produce a thermoplastic elastomer composition, in Comparative Examples 4 to 5. Then, their physical properties were compared.

The formulation, revolution number at the time of dynamic crosslinking, ideal torque ratio, maximum torque ratio, average particle size of crosslinked diene rubber particles and physical properties of the crosslinked materials of Examples 5 to 6 are shown in Table 4. In addition, the formulation amount, revolution number at the time of kneading, time and physical properties of the crosslinked materials of Comparative Examples 4 to 5 are shown in Table 5. In addition, the indicating method, dynamic crosslinking method and measuring method of the particle size and physical properties are the same as those of Example 1.

In addition, the diene rubbers used in Examples 5 to 6 and Comparative Examples 4 to 5 are as follows.

Diene Rubbers:

Esprene 301 (ethylene-propylene-diene rubber (EPDM), manufactured by Sumitomo Chemical Industries Co., Ltd.)

Nodel 1470 (ethylene-propylene-diene rubber (EPDM), manufactured by Showa Denko Co., Ltd.)

TABLE 4

|  | Example 5 | Example 6 |
|---|---|---|
| Hi-milan AM7315 | 80 | 60 |
| Esprene 301 | 20 | 0 |
| Nodel 1470 | 0 | 20 |
| Barium sulfate | 4 | 4 |
| Stearic acid | 0.2 | 0.2 |
| Crosslinking agent (oxime) (based on 100 parts by weight of rubber) | 0.4 (2) | 0.4 (2) |
| Revolution number (rpm) | 100 | 100 |
| Ideal torque ratio | 102 | 102 |

TABLE 4-continued

|  | Example 5 | Example 6 |
|---|---|---|
| Maximum torque ratio | 105 | 104 |
| Average particle size ($\mu$m) | 10 | 9 |
| Tensile strength (kg/cm$^2$) | 228.3 | 190.8 |
| Elongation (%) | 267 | 253 |
| Elongation set (%) | 25.4 | 29.9 |

TABLE 5

|  | Comparative Example 4 | Comparative Example 5 |
|---|---|---|
| Hi-milan AM7315 | 80 | 80 |
| Esprene 301 | 20 | 0 |
| Nodel 1470 | 0 | 20 |
| Barium sulfate | 4 | 4 |
| Stearic acid | 0.2 | 0.2 |
| Revolution number (rpm) | 100 | 100 |
| Time (minute) | 10 | 10 |
| Tensile strength (kg/cm$^2$) | 190.2 | 198.8 |
| Elongation (%) | 216 | 250 |
| Elongation set (%) | 78.5 | 85.1 |

As is apparent from the results shown in Tables 4 and 5, the thermoplastic elastomer compositions of Examples 5 to 6 showed a small elongation set and were superior in restoring force to those of Comparative Examples 4 to 5. In addition, a considerable decrease in tensile strength and elongation was not observed.

Examples 7 to 8 and Comparative Examples 6 to 7

According to the same manner as that described in Example 1 except for using a butadiene rubber as the diene rubber and changing the amount thereof, the mixture was subjected to dynamic crosslinking to produce a thermoplastic elastomer composition, in Examples 7 to 8. According to the same manner as that described in Example 1 except for using a butadiene rubber as the diene rubber and changing the amount thereof, the mixture was only kneaded to produce a thermoplastic elastomer composition, in Comparative Examples 6 to 7. Then, their physical properties were compared.

The formulation, revolution number at the time of dynamic crosslinking, ideal torque ratio, maximum torque ratio, average particle size of crosslinked diene rubber particles and physical properties of the crosslinked materials of Examples 7 to 8 are shown in Table 6. In addition, the formulation amount, revolution number at the time of kneading, time and physical properties of the crosslinked materials of Comparative Examples 6 to 7 are shown in Table 7. In addition, the indicating method, dynamic crosslinking method and measuring method of the particle size and physical properties are the same as those of Example 1.

In addition, the diene rubber used in Examples 7 to 8 and Comparative Examples 6 to 7 is as follows.

Diene Rubber:

BR01 (Hi-cis butadiene rubber, manufactured by Nihon Synthetic Rubber Co., Ltd.)

TABLE 6

|  | Example 7 | Example 8 |
|---|---|---|
| Hi-milan AM7315 | 80 | 60 |
| BR01 | 20 | 40 |
| Barium sulfate | 4 | 8 |
| Stearic acid | 0.2 | 0.4 |
| Crosslinking agent (oxime) (based on 100 parts by weight of rubber) | 0.4 (2) | 0.8 (2) |
| Revolution number (rpm) | 100 | 100 |
| Ideal torque ratio | 102 | 104 |
| Maximum torque ratio | 104 | 107 |
| Average particle size ($\mu$m) | 8 | 4 |
| Tensile strength (kg/cm$^2$) | 223.7 | 190.0 |
| Elongation (%) | 307 | 365 |
| Elongation set (%) | 30.2 | 27.2 |

TABLE 7

|  | Comparative Example 6 | Comparative Example 7 |
|---|---|---|
| Hi-milan AM7315 | 80 | 60 |
| BR01 | 20 | 40 |
| Barium sulfate | 4 | 8 |
| Stearic acid | 0.2 | 0.4 |
| Revolution number (rpm) | 100 | 100 |
| Time (minute) | 8 | 8 |
| Tensile strength (kg/cm$^2$) | 193.5 | 162.5 |
| Elongation (%) | 225 | 235 |
| Elongation set (%) | 80.3 | 70.5 |

As is apparent from the results shown in Tables 6 and 7, the thermoplastic elastomer compositions of Examples 7 to 8 showed a small elongation set and were superior in restoring force to those of Comparative Examples 6 to 7. In addition, a considerable decrease in tensile strength and elongation was not observed, and they were rather superior.

Examples 9 to 10

According to the same manner as that described in Example 1 except for changing the kind of the crosslinking agent and using sulfur and a vulcanization accelerator, the mixture was subjected to dynamic crosslinking to produce a thermoplastic elastomer composition. Then, their physical properties were measured.

The formulation, revolution number at the time of dynamic crosslinking, ideal torque ratio, maximum torque ratio, average particle size of crosslinked diene rubber particles and physical properties of the crosslinked materials of Examples 9 to 10 are shown in Table 8. In addition, the indicating method, dynamic crosslinking method and measuring method of the particle size and physical properties are the same as those of Example 1.

In addition, the crosslinking agent used in Examples 9 to 10 is as follows.
Crosslinking Agent:
  Sulfur
  Vulcanization accelerator (tetrabutylthiuram disulfide, Nocceler TT (trade name), manufactured by Ohuchi Shinko Kagaku Kogyo Co., Ltd.)

TABLE 8

|  | Example 9 | Example 10 |
|---|---|---|
| Hi-milan AM7315 | 80 | 60 |
| BR01 | 20 | 40 |
| Barium sulfate | 4 | 8 |
| Stearic acid | 0.2 | 0.4 |
| Crosslinking agent (oxime) based on 100 parts by weight of rubber |  |  |
| Sulfur | 0.4 (2) | 0.8 (2) |
| Vulcanization accelerator TT | 0.4 (2) | 0.8 (2) |
| Revolution number (rpm) | 100 | 100 |
| Ideal torque ratio | 102 | 104 |
| Maximum torque ratio | 106 | 110 |
| Average particle size ($\mu$m) | 2.1 | 0.9 |
| Tensile strength (kg/cm$^2$) | 241.2 | 203.8 |
| Elongation (%) | 291 | 311 |
| Elongation set (%) | 31.6 | 24.9 |

Comparative Examples corresponding to Examples 9 to 10 are Comparative Examples 6 to 7. As is apparent from the results shown in Tables 8 and 7, the thermoplastic elastomer compositions of Examples 9 to 10 showed a small elongation set and were superior in restoring force to those of Comparative Examples 6 to 7. In addition, a considerable decrease in tensile strength and elongation was not observed.

Example 11 and Comparative Example 8

According to the same manner as that described in Example 1 except for changing the revolution number at the time of dynamic crosslinking (changing from 100 rpm to 150 rpm), the mixture was subjected to dynamic crosslinking to produce a thermoplastic elastomer composition, in Example 11. According to the same manner as that described in Comparative Example 1 except for changing the revolution number at the time of kneading (changing from 100 rpm to 150 rpm), the mixture was kneaded to produce a thermoplastic elastomer composition, in Comparative Example 8. In Example 11, a change in average particle size of crosslinked diene rubber particles and that in physical properties were examined. In Comparative Example 8, a change in physical properties was examined.

The formulation, revolution number at the time of dynamic crosslinking, ideal torque ratio, maximum torque ratio, average particle size of crosslinked diene rubber particles and physical properties of the crosslinked material of Example 11 as well as formulation, revolution number at the time of kneading, time and physical properties of the crosslinked material of Comparative Example 8 are shown in Table 9. In addition, the indicating method, and measuring method of the particle size and physical properties are the same as those of Example 1.

TABLE 9

|  | Example 11 | Comparative Example 8 |
|---|---|---|
| Hi-milan AM7315 | 80 | 80 |
| Esprene 501A | 20 | 20 |
| Barium sulfate | 4 | 4 |
| Stearic acid | 0.2 | 0.2 |
| Crosslinking agent (oxime) (based on 100 parts by weight of rubber) | 0.4 (2) | 0 (0) |
| Revolution number (rpm) | 150 | 150 |
| Ideal torque ratio | 102 | time |
| Maximum torque ratio | 107 | 8 minutes |
| Average particle size ($\mu$m) | 3 | — |
| Tensile strength (kg/cm$^2$) | 205.0 | 192.3 |

TABLE 9-continued

|  | Example 11 | Comparative Example 8 |
|---|---|---|
| Elongation (%) | 189 | 168 |
| Elongation set (%) | 13.7 | 70.7 |

As is shown in Table 9, the thermoplastic elastomer composition of Example 11 showed a small elongation set and was superior in restoring force to that of Comparative Example 8. In addition, a considerable decrease in tensile strength and elongation was not admitted observed, and they were rather superior.

The thermoplastic elastomer composition of Example 11 was compared with that of Example 11. As a result, the average particle size of crosslinked diene rubber particles became small from 8 μm to 3 μm and, at the same time, the elongation set became small from 22.3% to 13.7%. On the other hand, in Comparative Examples 8 and 1, the elongation set became small but the tensile strength and elongation were lowered.

Example 12

According to the same manner as that described in Example 1 except for changing the kind of the crosslinking agent and using sulfur and a vulcanization accelerator according to the same manner as that described in Example 4 except for changing the revolution number at the time of dynamic crosslinking (i.e. changing from 100 rpm to 150 rpm), the mixture was subjected to dynamic crosslinking to produce a thermoplastic elastomer composition. Then, a change in average particle size of crosslinked diene rubber particles and that in physical properties were examined.

The formulation, revolution number at the time of dynamic crosslinking, ideal torque ratio and maximum torque ratio of Example 12 are shown in Table 10. Since Comparative Example corresponding to Example 12 is Comparative Example 8, the average particle size of crosslinked diene rubber particles and physical properties of the crosslinked material as well as formulation, revolution number at the time of kneading, time and physical properties of Comparative Example 8 are shown in Table 10. In addition, the indicating method and measuring method of the particle size and physical properties are the same as those of Example 1.

In addition, the crosslinking agent used in Example 12 is as follows.

Crosslinking Agent:

Sulfur

Vulcanization accelerator (tetrabutylthiuram disulfide, Nocceler TBT-N (trade name), manufactured by Ohuchi Shinko Kagaku Kogyo Co., Ltd.)

TABLE 10

|  | Example 12 | Comparative Example 8 |
|---|---|---|
| Hi-milan AM7315 | 80 | 80 |
| Esprene 501A | 20 | 20 |
| Barium sulfate | 4 | 4 |
| Stearic acid | 0.2 | 0.2 |
| Crosslinking agent (based on 100 parts by weight of rubber) | | |
| Sulfur | 0.4 (2) | 0 |
| Vulcanization accelerator TBT-N | 0.4 (2) | 0 |
| Revolution number (rpm) | 150 | 150 |
| Ideal torque ratio | 102 | Time |
| Maximum torque ratio | 111 | 8 minutes |
| Average particle size (μm) | 0.7 | — |
| Tensile strength (kg/cm$^2$) | 238.7 | 192.3 |
| Elongation (%) | 300 | 168 |
| Elongation set (%) | 16.7 | 70.7 |

As is shown in Table 10, the thermoplastic elastomer composition of Example 12 showed a small elongation set and was superior in restoring force to that of Comparative Example 8. In addition, a considerable decrease in tensile strength and elongation was not observed, and they were rather superior.

The thermoplastic elastomer composition of Example 12 was compared with that of Example 4. As a result, the average particle size of crosslinked diene rubber particles became small from 1.2 μm to 0.7 μm and, at the same time, the elongation set became small from 23.1% to 16.7%.

Examples 13 to 15 and Comparative Examples 9 to 11

According to the same manner as that described in Example 1 except for changing the amount of the crosslinking agent, the mixture was subjected to dynamic crosslinking to produce a thermoplastic elastomer composition, in Examples 13 to 15. According to the same manner as that described in Example 1 except for changing the amount of the crosslinking agent and torque value beyond the range of the present invention, the mixture was subjected to dynamic crosslinking to produce a thermoplastic elastomer composition, in Comparative Examples 9 to 10. In addition, physical properties of the thermoplastic resin Hi-milan AM7315 (trade name, ionomer resin) alone are shown in Comparative Example 11.

The formulation, revolution number at the time of dynamic crosslinking, ideal torque ratio and maximum torque ratio, average particle size of crosslinked diene rubber particles and physical properties of the crosslinked materials of Examples 13 to 15 are shown in Table 11. The formulation amount, revolution number at the time of dynamic crosslinking, ideal torque ratio and maximum torque ratio, average particle size of crosslinked diene rubber particles and physical properties of the crosslinked materials of Comparative Examples 9 to 10 are shown in Table 11. In addition, the indicating method and measuring method of the particle size and physical properties are the same as those of Example 1.

TABLE 11

|  | Example 13 | Example 14 | Example 15 |
|---|---|---|---|
| Hi-milan AM7315 | 80 | 80 | 80 |
| Esprene 501A | 20 | 20 | 20 |
| Barium sulfate | 4 | 4 | 4 |
| Stearic acid | 0.2 | 0.2 | 0.2 |
| Crosslinking agent (oxime) (based | 0.04 | 1 | 2 |

TABLE 11-continued

|  | Example 13 | Example 14 | Example 15 |
|---|---|---|---|
| on 100 parts by weight of rubber) | (0.2) | (5) | (10) |
| Revolution number (rpm) | 100 | 100 | 100 |
| Ideal torque ratio | 102 | 102 | 102 |
| Maximum torque ratio | 103 | 107 | 112 |
| Average particle size (μm) | 7 | 9 | 10 |
| Tensile strength (kg/cm$^2$) | 241.1 | 219.9 | 200.5 |
| Elongation (%) | 309 | 284 | 277 |
| Elongation set (%) | 20.7 | 25.0 | 30.3 |

TABLE 12

|  | Comparative Example 9 | Comparative Example 10 | Comparative Example 11 |
|---|---|---|---|
| Hi-milan AM7315 | 80 | 80 | 100 |
| Esprene 501A | 20 | 20 | 0 |
| Barium sulfate | 4 | 4 | 0 |
| Stearic acid | 0.2 | 0.2 | 0 |
| Crosslinking agent (oxime) (based on 100 parts by weight of rubber) | 0.01 (0.05) | 3 (15) | 0 0 |
| Revolution number (rpm) | 100 | 100 | — |
| Ideal torque ratio | 102 | 102 | — |
| Maximum torque ratio | 101 | 120 | — |
| Average particle size (μm) | 18 | 16 | — |
| Tensile strength (kg/cm$^2$) | 164.9 | 139.8 | 204.0 |
| Elongation (%) | 233 | 219 | 151 |
| Elongation set (%) | 72.2 | 54.8 | 97.3 |

As is apparent from the results shown in Tables 11 and 12, the thermoplastic elastomer compositions of Examples 13 to 15 showed a small elongation set and were superior in restoring force to those of Comparative Examples 9 to 10. In addition, they had the same or better characteristics (e.g. tensile strength, elongation, etc.) as that of Comparative Example 11 using the thermoplastic resin alone.

Examples 16 to 18 and Comparative Examples 12 to 14

Two-piece solid golf balls of Examples 16 to 18 and Comparative Examples 12 to 14 were made by allowing to go through the processes shown in the following items (1) to (3).

(1) Preparation of Core:

A rubber composition prepared by formulating 25 parts by weight of zinc acrylate, 23 parts by weight of zinc oxide and 1 part by weight of dicumyl peroxide in 100 parts by weight of BR01 (trade name, butadiene rubber manufactured by Nihon Synthetic Rubber Co., Ltd.) was put in a mold and subjected to heat molding under pressure at 155° C. for 30 minutes to make a core having a diameter of 38.5 mm.

(2) Preparation of cover Composition:

In Examples 16 to 18, the following ionomer resin, diene rubber and crosslinking agent were used in the amount described in Table 13 while changing a ratio of the diene rubber to the ionomer resin, and the mixture was subjected to dynamic crosslinking. In Comparative Examples 12 to 14, they were used in the amount described in Table 14, and the mixture was only kneaded.

Ionomer Resin:

Hi-milan AM7315 (trade name, ethylene-methacrylic acid copolymer ionomer resin neutralized with a zinc ion manufactured by Mitsui Du Pont Polychemical Co., Ltd.)

Diene Rubber:

Esprene 501(trade name, ethylene-propylene-diene rubber (EPDM) manufactured by Sumitomo Chemical Industries Co., Ltd.)

Crosslinking Agent:

Balnoc DGM (trade name, p,p'-dibenzoylquinone dioxime manufactured by Nihon Yushi Co., Ltd.)

The dynamic crosslinking in Examples 16 to 18 was carried out while kneading the formulation materials shown in Table 13 at 180° C. at 100 rpm using a laboplast mill manufactured by Toyo Seiki Co., Ltd. The kneading of the formulation materials shown in Table 14 in Comparative Examples 12 to 14 was carried out at 100 rpm using the same laboplast mill manufactured by Toyo Seiki Co., Ltd. Incidentally, since no crosslinking is formulated in Comparative Examples 12 to 14, no dynamic crosslinking of the diene rubber arises.

The termination of the dynamic crosslinking in Examples 16 to 18 was carried out by a method comprising terminating immediately after satisfying the above ideal torque ratio and reaching the maximum torque ratio. The kneading in Comparative Examples 12 to 14 was carried out by a method comprising kneading for the same time as that required for the dynamic crosslinking in the corresponding Example.

In addition, the amounts of the respective formulation materials in the respective tables are parts by weight. The thermoplastic resin and diene rubber are indicated by the trade name in the tables.

(3) Preparation of Golf Ball:

A two-piece solid golf ball having an outer diameter of 42.7 mm was made by pulverizing the cover composition of the above (2) into pieces of 3 to 5 mm, molding them to form a half-shell, covering the core of the above (1) using two half-shells, followed by heat molding at 160° C. for 3 minutes.

The weight, resilience coefficient and flight distance of the resulting golf ball were measured and the shot feel was determined. The measuring method of the resilience coefficient and flight distance as well as evaluation method of the shot feel were as follows.

Measuring Method of Resilience Coefficient:

A stainless steel column (198 g) is launched at an initial velocity of 35 m/second using an air gun to strike it against a golf ball ahead of the column. Then, the velocity of the column and golf ball before and after striking is measured, respectively, using two photoelectric tubes to calculate a resilience coefficient from each velocity and weight. The above measurement is carried out as to eight golf balls and the average value is taken as the value of the resilience coefficient.

Measuring Method of Flight Distance:

A golf ball (n=8) is hit with a No. 1 wood club at a head speed of 45 m/second using a swing robot manufactured by True Temper Co., and the distance to the drop point is measured. The results are shown by the average value.

Evaluation Method of Shot Feel:

A golf ball is practically hit with a No. 1 wood club by 5 top professional golfers and shot feel is evaluated according to the following seven-grade criteria.

HH: Too hard
H: Hard
AH: Slightly hard but within a good range
A: Good
AS: Slightly soft but within a good range
S: Soft
SS: Too soft In addition, the particle size of crosslinked diene rubber particles of the thermoplastic elastomer used for the cover was carried out by the following method.

Firstly, a sample for measurement was made by pulverizing the cover composition of the above (2) into pieces of 3 to 5 mm and subjecting to heat molding under pressure at 160° C. for 3 minutes to form a sheet. In addition, the particle size was determined by taking a reflection electron image micrograph using a scanning electron microscope (Model T-220A, manufactured by JEOL Co.) and measuring a perpendicular length of any fifty rubber particles. The numerical value due to number average was taken as an average particle size. In addition, no dynamic crosslinking was carried out in Comparative Examples 12 to 14 and the thermoplastic resin and diene rubber form a continuous layer, respectively. Therefore, the particle size could not be measured.

The formulation of the cover composition, revolution number at the time of dynamic crosslinking, ideal torque ratio, maximum torque ratio and average particle size of crosslinked diene rubber particles as well as weight, resilience coefficient, flight distance and evaluation results of the shot feel of the resulting golf balls of Examples 16 to 18 are shown in Table 13. The formulation of the cover composition, revolution number at the time of kneading and time as well as weight, resilience coefficient, flight distance and evaluation results of the shot feel of the resulting golf balls of Comparative Examples 12 to 14 are shown in Table 14.

TABLE 13

|  | Example 16 | Example 17 | Example 18 |
| --- | --- | --- | --- |
| Cover composition |  |  |  |
| Hi-milan AM7315 | 100 | 100 | 100 |
| Esprene 501A | 10 | 25 | 50 |
| Barium sulfate | 2 | 5 | 10 |
| Stearic acid | 0.1 | 0.25 | 0.5 |
| Crosslinking agent | 0.2 | 0.5 | 1.0 |
| (based on 100 parts by weight of rubber) | (2) | (2) | (2) |
| Revolution number (rpm) | 100 | 100 | 100 |
| Ideal torque ratio | 101 | 102 | 103 |
| Maximum torque ratio | 102 | 104 | 107 |
| Average particle size ($\mu$m) | 6 | 7 | 10 |
| Ball characteristics |  |  |  |
| Weight (g) | 45.3 | 45.4 | 45.4 |
| Resilience coefficient | 0.8362 | 0.8255 | 0.8178 |
| Flight distance (yard) | 227 | 225 | 224 |
| Shot feel | A | AS | AS |

TABLE 14

|  | Example 12 | Example 13 | Example 14 |
| --- | --- | --- | --- |
| Cover composition |  |  |  |
| Hi-milan AM7315 | 100 | 100 | 100 |
| Esprene 501A | 10 | 25 | 50 |
| Barium sulfate | 2 | 5 | 10 |
| Stearic acid | 0.1 | 0.25 | 0.5 |
| Revolution number (rpm) | 100 | 100 | 100 |
| Time (minute) | 10 | 7 | 7 |
| Ball characteristics |  |  |  |
| Weight (g) | 45.3 | 45.3 | 45.3 |
| Resilience coefficient | 0.8016 | 0.7955 | 0.7821 |
| Flight distance (yard) | 220 | 219 | 216 |
| Shot feel | S | SS | SS |

As is apparent from the results shown in Tables 13 and 14, the golf balls of Examples 16 to 18 showed a large resilience coefficient and long flight distance and were also superior in shot feel to those of Comparative Examples 12 to 14 wherein the formulation is the same but no crosslinking agent is contained.

Examples 19 to 20 and Comparative Examples 15 to 16

According to the same manner as that described in Example 16 except for changing the kind of the diene rubber, the mixture was subjected to dynamic crosslinking to prepare a cover composition, in Examples 19 to 20. According to the same manner as that described in Example 16 except for changing the kind of the diene rubber, the mixture was only kneaded to prepare a cover composition, in Comparative Examples 15 to 16. Then, their characteristics were evaluated.

In addition, the diene rubbers used in Examples 19 to 20 and Comparative Examples 15 to 16 are as follows.
Diene Rubbers:

Esprene 301 (ethylene-propylene-diene rubber (EPDM), manufactured by Sumitomo Chemical Industries Co., Ltd.)

Nodel 1470 (ethylene-propylene-diene rubber (EPDM), manufactured by Showa Denko Co., Ltd.)

The formulation of the cover composition, revolution number at the time of dynamic crosslinking, ideal torque ratio, maximum torque ratio and average particle size of crosslinked diene rubber particles as well as characteristics of the resulting golf balls of Examples 19 to 20 are shown in Table 15. In addition, the formulation of the cover composition, revolution number at the time of kneading and time as well as characteristics of the resulting golf balls of Comparative Examples 15 to 16 are shown in Table 16. In addition, the core used, the indicating method, dynamic crosslinking method and measuring method of the particle size and physical properties are the same as those of Example 16.

TABLE 15

|  | Example 19 | Example 20 |
| --- | --- | --- |
| Cover composition |  |  |
| Hi-milan AM7315 | 100 | 100 |
| Esprene 301 | 25 | 0 |
| Nodel 1470 | 0 | 25 |
| Barium sulfate | 5 | 5 |
| Stearic acid | 0.25 | 0.25 |
| Crosslinking agent | 0.5 | 0.5 |
| (based on 100 parts by weight of rubber) | (2) | (2) |
| Revolution number (rpm) | 100 | 100 |
| Ideal torque ratio | 102 | 102 |
| Maximum torque ratio | 104 | 104 |
| Average particle size ($\mu$m) | 8 | 7 |
| Ball characteristics |  |  |
| Weight (g) | 45.3 | 45.4 |
| Resilience coefficient | 0.8213 | 0.8222 |
| Flight distance (yard) | 224 | 225 |
| Shot feel | AS | AS |

TABLE 16

|  | Comparative Example 15 | Comparative Example 16 |
| --- | --- | --- |
| Cover composition |  |  |
| Hi-milan AM7315 | 100 | 100 |
| Esprene 301 | 25 | 0 |
| Nodel 1470 | 0 | 25 |
| Barium sulfate | 5 | 5 |
| Stearic acid | 0.25 | 0.25 |
| Revolution number (rpm) | 100 | 100 |
| Time (minute) | 7 | 7 |

TABLE 16-continued

|  | Comparative Example 15 | Comparative Example 16 |
|---|---|---|
| Ball characteristics | | |
| Weight (g) | 45.2 | 45.4 |
| Resilience coefficient | 0.8023 | 0.8040 |
| Flight distance (yard) | 220 | 221 |
| Shot feel | SS | S |

As is apparent from the results shown in Tables 15 and 16, the golf balls of Examples 19 to 20 showed a large resilience coefficient and long flight distance and were also superior in shot feel to those of Comparative Examples 15 to 16.

Examples 21 to 22 and Comparative Examples 17 to 18

According to the same manner as that described in Example 16 except for using a butadiene rubber as the diene rubber while changing the amount, the mixture was subjected to dynamic crosslinking to prepare a cover composition, in Examples 21 to 22. According to the same manner as that described in Example 16 except for using a butadiene rubber as the diene rubber while changing the amount, the mixture was only kneaded to prepare a cover composition, in Comparative Examples 17 to 18. Then, their characteristics were measured.

In addition, the diene rubbers used in Examples 21 to 22 and Comparative Examples 17 to 18 are as follows.

Diene Rubber:

BR01 (Hi-cis butadiene rubber (EPDM), manufactured by Nihon Synthetic Rubber Co., Ltd.)

The formulation of the cover composition, revolution number at the time of dynamic crosslinking, ideal torque ratio, maximum torque ratio and average particle size of crosslinked diene rubber particles of as well as characteristics of the resulting golf balls of Examples 21 to 22 are shown in Table 17. In addition, the formulation of the cover composition, revolution number at the time of kneading and time as well as characteristics of the resulting golf balls of Comparative Examples 17 to 18 are shown in Table 18. In addition the core used, the indicating method, dynamic crosslinking method and measuring method of the particle size and physical properties are the same as those of Example 16.

TABLE 17

|  | Example 21 | Example 22 |
|---|---|---|
| Cover composition | | |
| Hi-milan AM7315 | 100 | 100 |
| BR01 | 25 | 50 |
| Barium sulfate | 5 | 10 |
| Stearic acid | 0.25 | 0.5 |
| Crosslinking agent (based on 100 parts by weight of rubber) | 0.5 (2) | 1 (2) |
| Revolution number (rpm) | 100 | 100 |
| Ideal torque ratio | 102 | 103 |
| Maximum torque ratio | 107 | 112 |
| Average particle size ($\mu$m) | 7 | 8 |

TABLE 17-continued

|  | Example 21 | Example 22 |
|---|---|---|
| Ball characteristics | | |
| Weight (g) | 45.5 | 45.4 |
| Resilience coefficient | 0.8301 | 0.8282 |
| Flight distance (yard) | 226 | 225 |
| Shot feel | AS | AS |

TABLE 18

|  | Comparative Example 17 | Comparative Example 18 |
|---|---|---|
| Cover composition | | |
| Hi-milan AM7315 | 100 | 100 |
| BR01 | 25 | 50 |
| Barium sulfate | 5 | 10 |
| Stearic acid | 0.25 | 0.5 |
| Revolution number (rpm) | 100 | 100 |
| Time (minute) | 7 | 7 |
| Ball characteristics | | |
| Weight (g) | 45.3 | 45.3 |
| Resilience coefficient | 0.7991 | 0.7863 |
| Flight distance (yard) | 219 | 217 |
| Shot feel | S | SS |

As is apparent from the results shown in Tables 17 and 18, the golf balls of Examples 21 to 22 showed a large resilience coefficient and long flight distance and were also superior in shot feel to those of Comparative Examples 17 to 18.

Example 23 and Comparative Example 19

According to the same manner as that described in Example 16 except for changing the revolution number at the time of dynamic crosslinking (changing from 100 rpm to 150 rpm), the mixture was subjected to dynamic crosslinking to prepare a cover composition, in Example 23. According to the same manner as that described in Example 12 except for changing the revolution number at the time of kneading (changing from 100 rpm to 150 rpm), the mixture was only kneaded to prepare a cover composition, in Comparative Example 19. Then, their characteristics were measured.

The formulation of the cover composition, revolution number at the time of dynamic crosslinking, ideal torque ratio, maximum torque ratio, average particle size of crosslinked diene rubber particles and characteristics of the resulting golf ball of Example 23 as well as formulation of the cover composition, revolution number at the time of kneading, time and characteristics of the resulting golf ball of Comparative Example 19 are shown in Table 19 respectively. In addition, the core used, the indicating method, dynamic crosslinking method and measuring method of the particle size and physical properties are the same as those of Example 16.

TABLE 19

|  | Example 23 | Comparative Example 19 |
|---|---|---|
| Cover composition | | |
| Hi-milan AM7315 | 100 | 100 |
| Esprene 501A | 25 | 25 |

TABLE 19-continued

|  | Example 23 | Comparative Example 19 |
|---|---|---|
| Barium sulfate | 5 | 5 |
| Stearic acid | 0.25 | 0.25 |
| Crosslinking agent | 0.5 | 0 |
| (based on 100 parts by weight of rubber) | (2) | (0) |
| Revolution number (rpm) | 150 | 150 |
| Ideal torque ratio | 102 | — |
| Maximum torque ratio | 107 | — |
| Time (minute) | 7 | 7 |
| Average particle size ($\mu$m) | 2 | — |
| Ball characteristics |  |  |
| Weight (g) | 45.4 | 45.4 |
| Resilience coefficient | 0.8370 | 0.7964 |
| Flight distance (yard) | 227 | 219 |
| Shot feel | AS | SS |

As shown in Table 19, the golf ball of Example 23 showed a large resilience coefficient and long flight distance and was also superior in shot feel to that of Comparative Example 19.

In addition, the golf ball of Example 23 was compared with that of Example 16. As a result, the average particle size of crosslinked diene rubber particles became small from 6 $\mu$m to 2 $\mu$m and, at the same time, the resilience coefficient and flight distance were improved. On the other hand, the resilience coefficient of the golf ball of Comparative Example 19 is slightly smaller than that of Comparative Example 12, and the shot feel became inferior.

Examples 24 to 25 and Comparative Examples 20 to 22

According to the same manner as that described in Example 16 except for changing the amount of the crosslinking agent, the mixture was subjected to dynamic crosslinking to prepare a cover composition, in Examples 24 to 25. According to the same manner as that described in Example 16 except for changing the amount of the crosslinking agent beyond the range of the present invention, the mixture was subjected to dynamic crosslinking to prepare a cover composition, in Comparative Examples 20 to 21. In Comparative Example 21, Hi-milan AM7315 (trade name, ionomer resin) alone was used as the cover composition to make a golf ball, and characteristics were evaluated.

The formulation of the cover composition, revolution number at the time of dynamic crosslinking, ideal torque ratio, maximum torque ratio and average particle size of crosslinked diene rubber particles as well as characteristics of the resulting golf balls of Examples 24 to 25 are shown in Table 20. The formulation of the cover composition, revolution number at the time of kneading and time as well as characteristics of the resulting golf balls of Comparative Examples 20 to 21 and ball characteristics of Comparative Example 22 are shown in Table 21. In addition, the core used, the indicating method, dynamic crosslinking method and measuring method of the particle size and physical properties are the same as those of Example 16.

TABLE 20

|  | Example 24 | Example 25 |
|---|---|---|
| Cover composition |  |  |
| Hi-milan AM7315 | 100 | 100 |
| Esprene 501A | 25 | 25 |
| Barium sulfate | 5 | 5 |
| Stearic acid | 0.25 | 0.25 |
| Crosslinking agent | 0.05 | 2.5 |
| (based on 100 parts by weight of rubber) | (0.2) | (10) |
| Revolution number (rpm) | 100 | 100 |
| Ideal torque ratio | 102 | 102 |
| Maximum torque ratio | 103 | 108 |
| Average particle size ($\mu$m) | 7 | 6 |
| Ball characteristics |  |  |
| Weight (g) | 45.4 | 45.3 |
| Resilience coefficient | 0.8215 | 0.8179 |
| Flight distance (yard) | 224 | 224 |
| Shot feel | AS | AS |

TABLE 21

|  | Comparative Example 20 | Comparative Example 21 | Comparative Example 22 |
|---|---|---|---|
| Cover composition |  |  |  |
| Hi-milan AM7315 | 100 | 100 | 100 |
| Esprene 501A | 25 | 25 | 0 |
| Barium sulfate | 5 | 5 | 0 |
| Stearic acid | 0.25 | 0.25 | 0 |
| Crosslinking agent | 0.0125 | 3 | 0 |
| (based on 100 parts by weight of rubber) | (0.05) | (12) | 0 |
| Revolution number (rpm) | 100 | 100 | — |
| Ideal torque ratio | 102 | 102 | — |
| Maximum torque ratio | 101 | 115 | — |
| Average particle size ($\mu$m) | 16 | 14 | — |
| Ball characteristics |  |  |  |
| Weight (g) | 45.4 | 45.5 | 45.3 |
| Resilience coefficient | 0.8033 | 0.8041 | 0.8049 |
| Flight distance (yard) | 220 | 221 | 221 |
| Shot feel | S | S | HH |

As is apparent from the results shown in Tables 20 and 21, the golf balls of Examples 24 to 25 showed a large resilience coefficient and flight distance and were also superior in shot feel to those of Comparative Examples 20 to 22.

What is claimed is:

1. A thermoplastic elastomer composition comprising a thermoplastic resin and crosslinked diene rubber particles having an average diameter of not more than 10 $\mu$m dispersed in the thermoplastic resin, wherein the thermoplastic resin is an ethylene-acrylic acid copolymer neutralized with a metal ion, an ethylene-methacrylic acid copolymer neutralized with a metal ion or an ethylene-acrylic acid-methacrylic acid terpolymer neutralized with a metal ion; said elastomer composition being prepared by dispersing the diene rubber in the thermoplastic resin to form a mixture in a mixing device, calculating the actual torque value of the mixing device, dynamically crosslinking the diene rubber with a crosslinking agent in the mixing device and then terminating the dynamic crosslinking immediately upon reaching the ideal torque value B defined by the equation:

$$B=100+(10\times A)$$

wherein A is defined as $$A = \frac{\text{weight of diene rubber}}{\text{weight of thermoplastic} + \text{weight of diene rubber}}$$

provided that (i) the actual torque before dynamic crosslinking is calculated on the basis of 100×; and (ii) crosslinking is terminated prior to reaching maximum torque.

2. The thermoplastic elastomer composition according to claim 1, wherein the diene rubber is an ethylene-propylene-diene rubber.

3. The thermoplastic elastomer composition according to claim 1, wherein the diene rubber is a butadiene rubber.

4. The thermoplastic elastomer composition according to claim 1, wherein the crosslinking is an oxime crosslinking agent.

5. The thermoplastic elastomer composition according to claim 1, wherein the crosslinking agent is a mixture of sulfur and a vulcanization accelerator.

6. A process for producing a thermoplastic elastomer composition, which comprises dispersing a diene rubber in a thermoplastic resin, to form a mixture in a mixing device, calculating the actual torque value of the mixing device, dynamically crosslinking the diene rubber with a crosslinking agent in the mixing device and then terminating the dynamic crosslinking immediately upon reaching the ideal torque value B defined by the equation $$B=100+(10\times A)$$

wherein A is defined as $$A = \frac{\text{weight of diene rubber}}{\text{weight of thermoplastic} + \text{weight of diene rubber}}$$

provided that (i) the actual torque before dynamic crosslinking is calculated on the basis of 100, and (ii) crosslinking is terminated prior to reaching maximum torque so as to disperse crosslinked diene rubber particles having an average particle size of not more than 10 $\mu$m in the thermoplastic resin, and wherein the thermoplastic resin is an ethylene-acrylic acid copolymer neutralized with a metal ion, or an ethylene-methacrylic acid copolymer neutralized with a metal ion or an ethylene-acrylic acid-methacrylic acid terpolymer neutralized with a metal ion.

7. A golf ball comprising a core and a cover covering the core, wherein said cover comprises, as base polymer, a thermoplastic elastomer composition according to claim 1.

8. The golf ball according to claim 7, wherein the diene rubber is an ethylene-propylene-diene rubber.

9. The golf ball according to claim 7, wherein the diene rubber is a butadiene rubber.

10. The golf ball according to claim 7, wherein the crosslinking is an oxime crosslinking agent.

11. The golf ball according to claim 7, wherein the crosslinking agent is a mixture of sulfur and a vulcanization accelerator.

* * * * *